(12) United States Patent
Cho et al.

(10) Patent No.: US 10,807,522 B2
(45) Date of Patent: Oct. 20, 2020

(54) SOFT UPPER TRIM FOR SWITCH ASSEMBLY OF VEHICLE DOOR AND METHOD OF MANUFACTURING THE SAME

(71) Applicants: SEOYON E-HWA CO., LTD., Seoul (KR); SEOYON AMERICA CORPORATION, Auburn Hills, MI (US)

(72) Inventors: Ji Hyun Cho, Cheonan-si (KR); Dong Suk Kim, Asan-si (KR); Jong Kyu Kim, Cheonan-si (KR); Sung Won Lee, Seoul (KR)

(73) Assignees: SEOYON E-HWA CO., LTD., Seoul (KR); SEOYON AMERICA CORPORATION, Auburn Hills, MI (US)

( * ) Notice: Subject to any disclaimer, the term of this patent is extended or adjusted under 35 U.S.C. 154(b) by 65 days.

(21) Appl. No.: 16/185,409

(22) Filed: Nov. 9, 2018

(65) Prior Publication Data

US 2019/0275930 A1  Sep. 12, 2019

(30) Foreign Application Priority Data

Mar. 9, 2018 (KR) .......................... 10-2018-0027752
Mar. 9, 2018 (KR) .......................... 10-2018-0027754

(51) Int. Cl.
| | |
|---|---|
| B60Q 3/217 | (2017.01) |
| F21V 8/00 | (2006.01) |
| B60Q 3/64 | (2017.01) |
| B60R 13/02 | (2006.01) |
| H01H 9/16 | (2006.01) |

(52) U.S. Cl.
CPC ............... *B60Q 3/217* (2017.02); *B60Q 3/64* (2017.02); *B60R 13/0243* (2013.01); *G02B 6/006* (2013.01); *G02B 6/0036* (2013.01); *G02B 6/0065* (2013.01); *G02B 6/0088* (2013.01); *H01H 9/161* (2013.01); *B60Q 2500/10* (2013.01); *B60R 2013/0287* (2013.01); *H01H 2219/056* (2013.01); *H01H 2219/062* (2013.01); *H01H 2229/02* (2013.01); *H01H 2229/044* (2013.01); *H01H 2229/056* (2013.01)

(58) Field of Classification Search
None
See application file for complete search history.

(56) References Cited

U.S. PATENT DOCUMENTS

| | | | | |
|---|---|---|---|---|
| 4,710,858 A | * | 12/1987 | Van Hout ............ | H01H 23/025 200/315 |
| 2012/0168288 A1 | * | 7/2012 | Furrer .................... | H01H 3/122 200/61.58 R |

FOREIGN PATENT DOCUMENTS

| | | |
|---|---|---|
| JP | 4218660 | 2/2009 |
| KR | 101087875 | 11/2011 |
| KR | 20170074740 | 6/2017 |

* cited by examiner

*Primary Examiner* — Elmito Breval
(74) *Attorney, Agent, or Firm* — Cantor Colburn LLP

(57) ABSTRACT

Provided is a soft upper trim of a vehicle door, in which an upper substrate, a foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

4 Claims, 5 Drawing Sheets

SOFT UPPER TRIM FOR SWITCH ASSEMBLY OF VEHICLE DOOR AND METHOD OF MANUFACTURING THE SAME

BACKGROUND

1. Technical Field

The present invention relates to a soft upper trim of a vehicle door, in which an upper substrate, a foam, and a transparent skin are laminated, and particularly, to a soft upper trim for switch assembly of a vehicle door, in which a switch, which is configured to preserve continuity of a transparent skin and display lock and unlock symbols on the transparent skin, is easily assembled to an upper substrate, and a method of manufacturing the same.

2. Description of Related Art

A foamed skin trim 70 (see FIG. 1) at a door upper trim side for a vehicle is disclosed in the patent document (Korean Patent Registration No. 10-1087875).

That is, a substrate for a door trim of a vehicle is divided into an injection-molded upper substrate, a center substrate, and a lower substrate. The three divided substrates are connected through screws or the like.

In addition, a foam-molded foam 50 and a transparent skin 60 are further laminated on the upper substrate 20 (see FIG. 1).

The foam 50 provides a cushioning sensation, and the transparent skin 60 provides a luxurious feeling, such as a leather feeling.

On the other hand, in the patent document (Japanese Patent Publication No. 4218660), as illustrated in FIGS. 2 and 3, when a driver puts a hand near a driving seat, operating symbols are displayed on a decorative panel 14, and the driver presses a desired operating symbol to operate.

That is, a switch device 10 configured to display a symbol is a hidden switch type which is embedded in a substrate of a door trim of a vehicle.

The hidden switch device 10 has a structure which is embedded only in a hard substrate. In particular, the hidden switch device 10 is embedded to be disposed between an upper portion and a lower portion of a lower trim.

Therefore, drivers who get out of the vehicle may not check a symbol inside the vehicle through a window.

In particular, after a door is locked or unlocked, when drivers get out of the vehicle, the drivers tend to check the symbol through the window, but such a demand may not be satisfied.

Above all, when the conventional switch device 10 is mounted on an upper trim, holes, into which the switch device 10 is inserted, should be formed in the transparent skin 60 and the foam 50, and after the switch is mounted, a finishing treatment should be performed with the transparent skin 60. However, the finishing treatment is postprocessed and thus may not attractive and likely to drop a price of the vehicle.

Due to the possibility of damage of the transparent skin 60, the conventional hidden switch device 10 has been provided on a hard substrate as illustrated in FIGS. 2 and 3.

Meanwhile, in the patent document (Korean Patent Laid-Open Publication No. 10-2017-0074740), since a switch is embedded in a substrate, the same problem arises similarly to the patent document (Japanese Patent Publication No. 4218660).

PRIOR-ART DOCUMENTS

Patent Documents (Patent Document 1) Korean Patent Registration No. 10-1087875
(Patent Document 2) Japanese Patent Publication No. 4218660
(Patent Document 3) Korean Patent Laid-Open Publication No. 10-2017-0074740

SUMMARY

1. Technical Problem

The present invention has been made to solve the above-mentioned problems, and a technical objective of the present invention is to provide a soft door trim for switch assembly of a vehicle, which is capable of displaying symbols on a transparent skin on an upper door trim thereof without damaging the transparent skin, and a method of manufacturing the same.

2. Solution to Problem

In order to achieve the above objects, a method of manufacturing a soft upper trim for switch assembly of a vehicle door in an embodiment of the present invention includes: (a) injection-molding an upper substrate which has a vertical through-hole formed therein and an inclined upper surface; (b) applying an adhesive on the upper surface of the upper substrate; (c) vacuum-pressing an integrated product on the upper surface of the upper substrate in an in-mold grain (IMG) mold in which a core mold is inserted in the through-hole of the upper substrate, wherein the integrated product is formed by vertically and integrally laminating a transparent skin and a foam; (d) boring a hole from a lower surface to an upper surface of the foam after removing the core mold; and (e) inserting a light guide plate from a lower portion to an upper portion of the through-hole, wherein the light guide plate has an upper surface engraved with a symbol and is inserted until the symbol of the light guide plate approaches or comes into contact with the hole.

A method of manufacturing a soft upper trim for switch assembly of a vehicle door in an embodiment of the present invention includes: (a) injection-molding an upper substrate which has a vertical through-hole formed therein and an inclined upper surface; (b) vacuum-pressing an integrated product on the upper surface of the upper substrate in an IMG mold in which a core mold is inserted in the through-hole of the upper substrate, wherein the integrated product is formed by integrating an upper transparent skin and a lower foam and has a lower surface applied with an adhesive in advance; (c) boring a hole from a lower surface to an upper surface of the foam after removing the core mold; and (d) inserting a light guide plate from a lower portion to an upper portion of the through-hole, wherein the light guide plate has an upper surface engraved with a symbol and is inserted until the symbol of the light guide plate approaches or comes into contact with the hole.

A method of manufacturing a soft upper trim for switch assembly of a vehicle door in an embodiment of the present invention includes: (a) injection-molding an upper substrate which has a vertical through-hole formed therein and an inclined upper surface; (b) applying an adhesive on the upper surface of the upper substrate; (c) locally compressing a foam using a hot core mold by vacuum-pressing an integrated product on the upper surface of the upper substrate in an IMG mold in which the hot core mold is inserted in the through-hole of the upper substrate, wherein the integrated product is formed by vertically and integrally laminating a transparent skin and the foam; (d) forming a foam recessed groove in a lower surface of the foam after removing the hot core mold; and (e) inserting a light guide plate into the foam recessed groove through the through-hole, wherein the light guide plate has an upper surface engraved with a symbol.

A method of manufacturing a soft upper trim for switch assembly of a vehicle door in an embodiment of the present invention includes: (a) injection-molding an upper substrate which has a vertical through-hole formed therein and has an inclined upper surface; (b) locally compressing a lower foam using a hot core mold by vacuum-pressing an integrated product on the upper surface of the upper substrate in an IMG mold in which the hot core mold is inserted in the through-hole of the upper substrate, wherein the integrated product is formed by integrating an upper transparent skin and the lower foam and has a lower surface with an adhesive pre-applied; (c) forming a foam recessed groove in a lower surface of the foam after removing the hot core mold; and (d) inserting a light guide plate into the foam recessed groove through the through-hole, wherein the light guide plate has an upper surface engraved with a symbol.

The method in an embodiment of the present invention may further include fixing the light guide plate to the upper substrate after the inserting of the light guide plate.

In the method in an embodiment of the present invention, the local compressing of the lower foam may include compressing the foam using the hot core mold such that the lower foam has a compressed thickness of 0.4 mm to 0.6 mm.

A soft upper trim for switch assembly of a vehicle door in an embodiment of the present invention includes an upper substrate, a foam, and a transparent skin, which are laminated, wherein the upper substrate has a through-hole vertically formed therein, in which a switch module is inserted, an upper surface of the upper substrate is formed as an inclined surface which is gradually inclined upward toward the through-hole, the foam includes an inclined foam pressed on the inclined surface and a horizontal foam disposed in the through-hole and having a hole vertically formed therein, and a light guide plate is inserted into the through-hole such that a symbol is disposed at a position corresponding to the hole.

A soft upper trim for switch assembly of a vehicle door in an embodiment of the present invention includes an upper substrate, a foam, and a transparent skin, which are laminated, wherein the upper substrate has a first through-hole vertically formed therein, in which a switch module is disposed, an upper surface of the upper substrate is formed as an inclined surface which is gradually inclined upward toward the through-hole, the foam includes an inclined foam pressed on the inclined surface and a horizontal foam disposed in the through-hole, a foam recessed groove at least further recessed upward compared to the foam on the inclined surface of the upper substrate formed in a lower surface of the horizontal foam, and a light guide plate having an upper surface engraved with a symbol inserted into the through-hole and the foam recessed groove.

In the soft upper trim of the present invention, the light guide plate may include side plates, an upper plate which connects upper surfaces of the side plates and has the symbol engraved therein, and flanges which are formed at lower sides of the side plates and are caught on a latch stepped portion of the first through-hole, wherein an accommodation groove, in which a upper side of the switch module is inserted and accommodated, may be formed inside a lower side of the light guide plate.

3. Advantageous Effects

The present invention has the following effects.

Since an inclined surface is formed on an upper surface of an upper substrate so as to be gradually inclined upward toward a center of a through-hole of the upper substrate, considering that an upper surface of foam has a constant height, a thickness of a lower surface of the foam at an inclined surface side is much less than a thickness of the lower surface of the foam at a through-hole side. Accordingly, a viewing angle of a symbol is wide. That is, the symbol is clearly visible even when viewed from a side thereof.

In addition, due to an inclined surface, since it is possible to minimize a steeped portion of foam and minimize a thickness of a portion of the foam, in which a hole is formed, continuity of a conventional transparent skin is maintained to secure both of a hidden property of a switch module and smoothness of a transparent skin, thereby providing an excellent external appearance.

In particular, since a hole is formed in a non-transparent foam up to a position where symbols are placed, light illuminated on patterns of the symbols is clearly illuminated on a transparent skin.

Furthermore, since symbols are displayed on an upper substrate at a specific position close to a window, it is possible to check the symbols in the inside of a vehicle as well as through the window from the outside of the vehicle. In particular, it is possible to check whether a door is properly locked (when symbols are formed on a center substrate or a lower substrate, it is difficult or impossible for a driver to check the symbols inside or outside the vehicle).

Since an accommodation groove, in which an upper side of a switch module is accommodated, is formed in a center of a lower surface of a light guide plate, a thickness of an upper plate of the light guide plate is reduced by a thickness of the accommodation groove to considerably improve transmittance so that the accommodation groove further improves clearness of symbols and functions to additionally fix the switch module.

In addition, since a light guide plate has a structure which is inserted upward from a lower surface, a flange is placed at a lower side of the light guide plate in order to prevent the light guide plate from being arbitrarily separated. Thus, the flange is coupled to an upper substrate to fundamentally prevent the separation.

On the other hand, considering that an upper surface of foam has a constant height, since a foam recessed groove is formed in a lower surface of the foam at a through-hole side, a thickness of the upper surface is considerably reduced (for example, reduced to about 0.4 to about 0.6 mm). Accordingly, although the foam is made of a non-transparent material, transparency is secured to minimize scattering of light of a light-emitting diode (LED) of a switch and to allow the light to pass through a transparent skin.

In addition, due to an inclined surface, since it is possible to minimize a stepped portion of foam and minimize a thickness of a portion of the foam, through which light passes through, continuity of a conventional transparent skin is maintained to secure both of a hidden property of a switch module and smoothness of a transparent skin, thereby providing an excellent external appearance.

Figure 1:
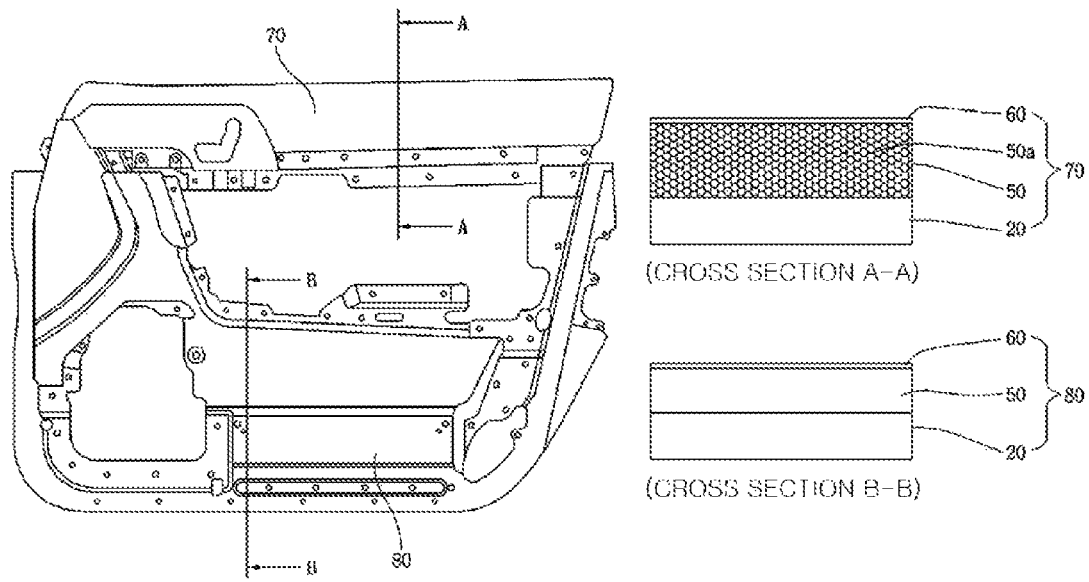
FIG. 1 illustrates a view of a conventional soft door trim for a vehicle and cross-sectional views of upper and lower trims thereof.
Figure 2:
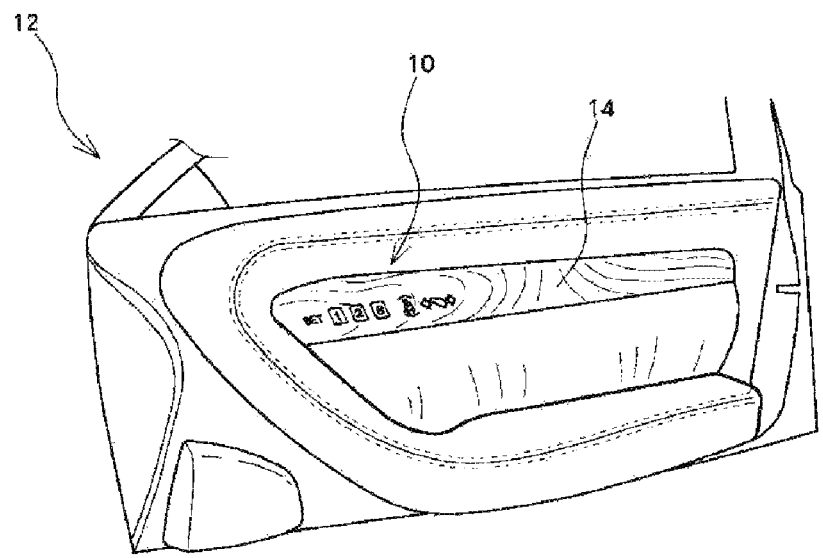
FIGS. 2 and 3 are diagrams illustrating an interior of a front seat door provided with a conventional switch device for a vehicle and illustrating states in which symbols of the switch device are displayed and not displayed.
Figure 3:
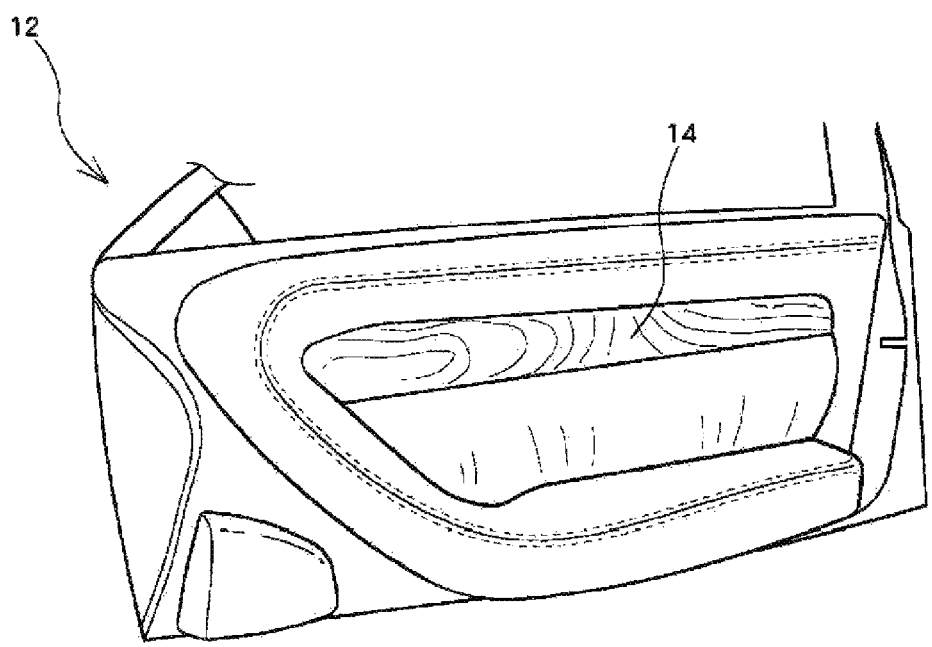

| (Description of Symbols) | |
|---|---|
| 100: soft upper trim for switch assembly of a vehicle door | |
| 1: switch module | 3: switch |
| 5: bezel | 200: upper substrate |
| 231: latch stepped portion | 300: light guide plate |
| 305: accommodation groove | 315: lock and unlock symbols |
| 400, 400': foam | 400, 401': inclined foam |
| 403, 403': horizontal foam | 500, 500': transparent skin |
| 600: adhesive | 700: hole |
| C: core mold | C': hot core mold |

DETAILED DESCRIPTION OF EMBODIMENTS

Hereinafter, exemplary embodiments of the present invention will be described in detail with reference to the accompanying drawings. The same reference numerals will be given to the same parts as conventional parts, and detailed description thereof will be omitted.

Figure 4:
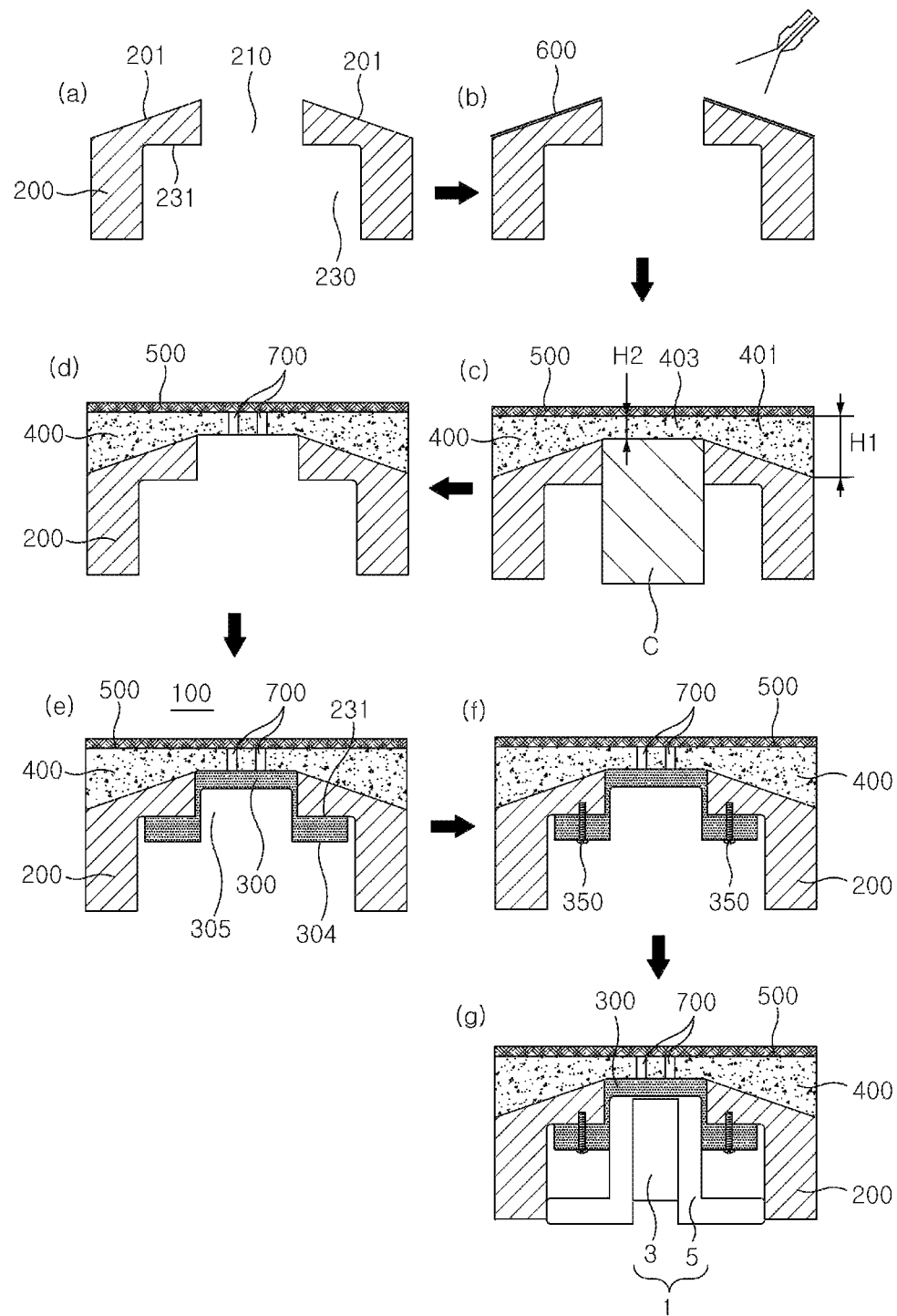
FIG. 4 is a set of sequence diagrams illustrating a method of manufacturing a soft upper trim for switch assembly for a vehicle door according to a first exemplary embodiment of the present invention.
Figure 5:
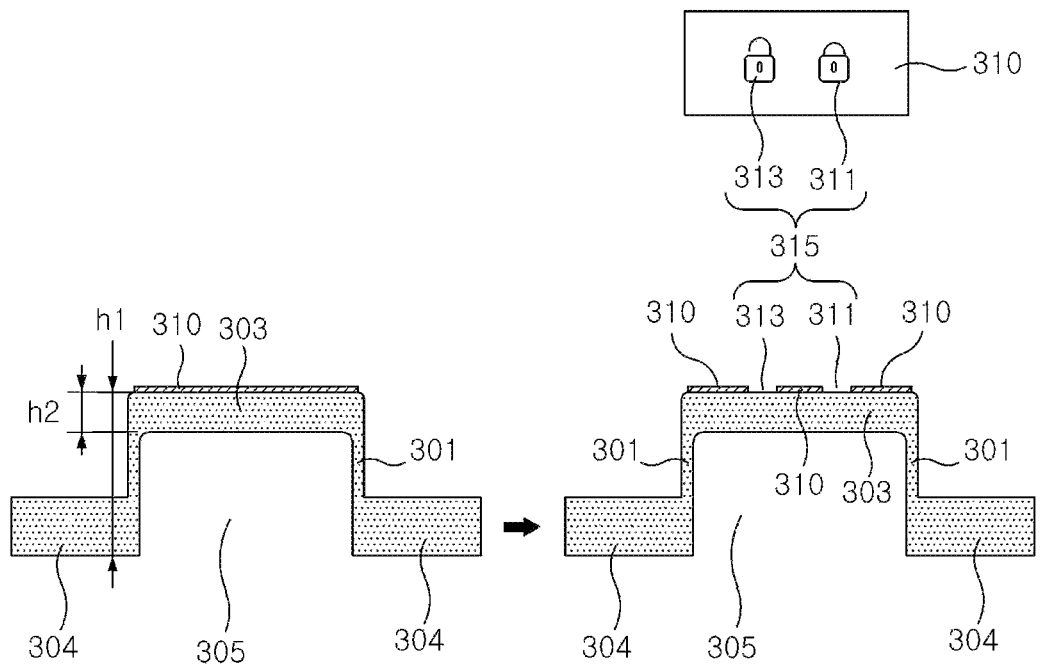
FIG. 5 is a set of sequence diagrams illustrating a process of engraving symbols in a light guide plate of FIG. 4.
Figure 6:
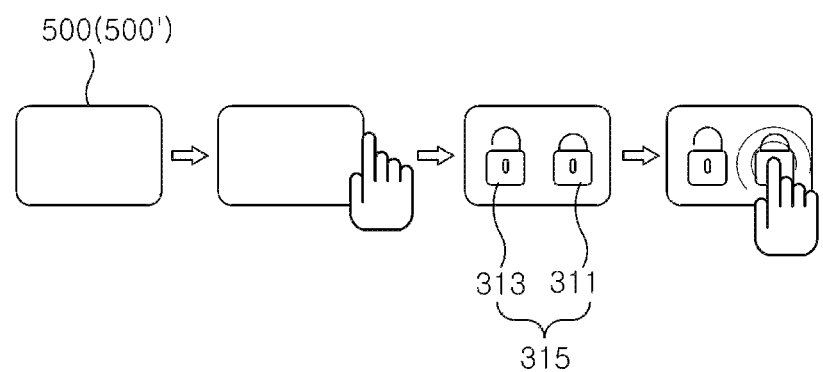
FIG. 6 is a set of operational sequence diagrams of a hidden switch.

FIG. 4 is a set of sequence diagrams illustrating a method of manufacturing a soft upper trim for switch assembly for a vehicle door according to a first exemplary embodiment of the present invention. FIG. 5 is a set of sequence diagrams illustrating a process of engraving symbols in a light guide plate of FIG. 4. FIG. 6 is a set of operational sequence diagrams of a hidden switch.

First Exemplary Embodiment

As illustrated in FIG. 4E, a soft upper trim 100 for switch assembly of a vehicle door includes an upper substrate 200 to which a switch module 1 is assembled, a light guide plate 300 assembled to the upper substrate 200, a foam 400, and a transparent skin 500, which are integrated, vacuum-pressed on upper surfaces of the light guide plate 300 and the upper substrate 200, and holes 700 formed in the foam 400.

The upper substrate 200 is an injection-molded product made of polypropylene (PP).

As illustrated in FIG. 4A, a through-hole 210 is formed in an upper side of the upper substrate 200 along a vertical center line thereof. A recessed groove 230 having a diameter greater than a diameter of the through-hole 210 is formed in a lower side of the upper substrate 200 so as to communicate with the through-hole 210.

A latch stepped portion 231, on which flanges 304 of the light guide plate 300 to be described below are caught, is formed in the large recessed groove 230.

In addition, an inclined surface 201 is formed on an upper surface of the upper substrate 200 around the through-hole 210.

The inclined surface 201 is gradually inclined upward toward the through-hole 210.

The inclined surface 201 serves to prevent a line of the transparent skin 500 from being exposed according to a change in thickness of the foam 400.

The light guide plate 300 is inserted and assembled in the through-hole 210.

The light guide plate 300 is a material affiliated to engineering plastic such as polycarbonate (PC) and functions to diffuse light of a light-emitting diode (LED (not shown)) of a switch device 3 in the switch module 1.

The foam 400 and the transparent skin 500 are pre-attached or pre-bonded to each other and thus are formed into an integrated product.

In addition, the foam 400 includes an inclined foam 401 and a horizontal foam 403.

That is, a lower surface of the inclined foam 401 has the same shape as the inclined surface 201 of the upper substrate 200. The horizontal foam 403 has a shape which is disposed above the through-hole 210. The foam 400 has an overall cross section with a trapezoidal shape of which a variable thickness is gradually decreased toward the through-hole 210.

Therefore, a thickness H2 of the horizontal foam 403 may be much less than a maximum thickness H1 of the inclined foam 401.

For example, since the maximum thickness H1 of the foam 400 is in a range of about 2 to 5 mm, the thickness H1 of the horizontal foam 430 may be reduced to at least half.

Therefore, since light emitted through the light guide plate 300 is illuminated on the very thin horizontal foam 403, a viewing angle is wide. Accordingly, even when symbols 315 are viewed at other angles, it is very advantageous to secure the visibility.

In addition, as illustrated in FIG. 5, after an opaque paint 310 is coated as masking on an upper surface of the light guide plate 300, patterns corresponding to a lock symbol 311 and an unlock symbol 313 are formed by cutting and removing the opaque pattern 310 using a laser. A film, on which the symbols 315 are formed, may be attached instead of the masking.

Therefore, when light is emitted through the light guide plate 300, the light may pass through only the lock and unlock symbols 311 and 313. Accordingly, a driver may view the lock/unlock symbols 311 and 313.

As illustrated in FIG. 5, the light guide plate 300 includes side plates 301, an upper plate 303 which connects upper surfaces of the side plates 301 and has the symbols 311 and 313 engraved therein, and flanges 304 formed at lower sides of the side plates 301. An accommodation groove 305, in which an upper side of the switch module 1 is inserted and accommodated, is further formed inside a lower side of the light guide plate 300.

Therefore, since a thickness h2 of the upper plate 303 is less than a thickness h1 of the light guide plate 300, light may be more clearly diffused and pass through the upper plate 303.

In addition, since the upper side of the switch module 1 is accommodated and assembled in the accommodation groove 305, the additional fixing of the switch module 1 is much better.

As illustrated in FIG. 4D, the integrated product of the transparent skin 500 and the foam 400 is vacuum-pressed on upper surfaces of the upper substrate 200 and the light guide plate 300 in an in-mold grain (IMG) mold.

During IMG laminating, a 3.5 mm fabric, in which the foam 400 having a maximum thickness of 3.0 mm and the transparent skin 500 having a thickness of 0.5 mm are laminated, is vertically vacuum-suctioned and pressed using a press having a capacity of about 30 tons.

The foam 400 may be foam foam-molded using a polypropylene (PP) or polyphenol oxidase (PPO)-based material.

Since the foam 400 covers the entire upper surfaces of the upper substrate 200 and the light guide plate 300 as described above, even when the transparent skin 500 is attached, the transparent skin 500 is prevented from being wrinkled or uneven.

Since the foam 400 is non-transparent, light doe not pass through the light guide plate 300. Thus, as illustrated in FIG. 4D, the holes 700 are bored using a laser.

The holes 700 are positioned at a similar position to where the symbols 315 of the light guide plate 300 are positioned.

That is, the holes 700 have two holes, i.e., a hole corresponding to the lock symbol 311 and a hole corresponding to the unlock symbol 313, and allow light to be illuminated such that clear symbols are displayed.

The holes 700 serve as a passage through which light passes, and thus, the symbols 315 are displayed on the transparent skin 500.

The transparent skin 500 integrally attached on an upper surface of the foam 400 may be a thermoplastic olefin (TPO) fabric which has a thickness of 0.5 to 1.0 mm or a thickness of 1.0 mm or more and a transmittance of about 10% to 15%.

The TPO fabric is a material which is widely used as an interior material of a vehicle.

The switch module 1 includes a switch device 3 which includes lock and unlock-corresponding LEDs, a printed circuit board (PCB), and the like, and a bezel 5 on which the switch device 3 is mounted.

A method of manufacturing the above-described soft upper trim 100 for switch assembly of a vehicle door will be described with reference to FIG. 4.

As illustrated in FIG. 4A, an upper substrate 200 having an inclined surface 201, i.e., an upper surface, is injection-molded, wherein a vertical through-hole 210, into which a switch module 1 is inserted through a lower side of the through-hole 210, is formed in the upper substrate 200.

After the upper substrate 200 is injection-molded, as illustrated in FIG. 4B, an adhesive 600 is applied on the inclined surface 201.

After the adhesive 600 is applied, as illustrated in FIG. 4C, in a state in which a core mold C is vertically inserted into the through-hole 210 of the upper substrate 200, a transparent skin 500 and a foam 400, which are vertically and integrally laminated, are placed on the upper surface 201 of the upper substrate 200 and are vacuum-pressed in an IMG mold.

The core mold C functions to locally compress a horizontal foam 403 to have a thickness H2 much less than a thickness H1 of an inclined foam 401.

After the transparent skin 500 and the foam 400 vertically and integrally laminated are vacuum-pressed on the upper surface 201 of the upper substrate 200, as illustrated in FIG. 4D, the core mold C is removed, and then, scoring is performed to bore holes 700 in the horizontal foam 403 having a minimum thickness by using a laser.

The holes 700 may be pre-bored in the foam 400, and then, the foam 400 may be vacuum-pressed. However, since a position of the foam 400 is very likely to be changed when the foam 400 is attached, the scoring may be performed after the foam 400 is vacuum-pressed.

The holes 700 are formed at the same positions as symbols 315 of the light guide plate 300.

After the holes 700 are formed, as illustrated in FIG. 4E, the light guide plate 300 is assembled in the through-hole 210.

The assembly of the light guide plate 300 is completed when the light guide plate 300 is inserted until a flange 304 is caught on a latch stepped portion 231.

In addition, since the light guide plate 300 has a structure which is inserted upward, in order to prevent the light guide plate 300 from moving downwardly after being assembled, as illustrated in FIG. 4F, the light guide plate 300 may be fixed on the flange 304 through pieces 350 or the like.

As illustrated in FIG. 4G, the switch module 1 is assembled in the accommodation groove 305 of the light guide plate 300 and the through-hole 210 in the soft upper trim 100 for switch assembly of a vehicle door as manufactured above.

The soft upper trim assembled with the switch module 1 is coupled to a center trim and a lower trim and is assembled and used as a final interior material of a vehicle door.

Accordingly, as illustrated in FIG. 6, when a driver's hand approaches within 15 mm of the transparent skin 500 at a position where the hidden switch module 1 is assembled, a proximity sensor senses the hand, and light of an LED passes through the holes. Thus, only the lock/unlock symbols 315 are displayed on the transparent skin 500.

When a desired symbol is touched among the displayed lock and unlock symbols 315, light of an undesired symbol is turned off, and the desired symbol is turned off after a few seconds, operation of the switch module 1 is ended.

To turn off the symbols 315, a light irradiation time of the LED may be set.

On the other hand, instead of ejecting and applying the adhesive 600 of FIG. 4B on the upper surface of the upper substrate 200, the foam 400, on which an adhesive is pre-applied on a lower surface of the inclined foam 401, may be vacuum-pressed on the inclined surface 201 of the upper substrate 200 in an IMG mold.

In addition, although it has been described that the symbols 315 are lock/unlock patterns, the symbols 315 also include an operation symbol for performing functions inside a vehicle or an illumination symbol on which a lighting pattern for LED mood lighting is formed.

Second Exemplary Embodiment

As illustrated in FIG. 7E, a soft upper trim 100' for switch assembly of a vehicle door according to the present exemplary embodiment includes an upper substrate 200 to which a switch module 1 is assembled, a light guide plate 300 assembled to the upper substrate 200, and a foam 400' and a transparent skin 500', which are integrated, vacuum-pressed on upper surfaces of the light guide plate 300 and the upper substrate 200.

Since the structure and function of the switch module 1, the upper substrate 200, and the light guide plate 300 of the second exemplary embodiment are the same as those of the first exemplary embodiment, the same reference numerals will be assigned to the switch module 1, the upper substrate 200, and the light guide plate 300, and detailed descriptions thereof will be omitted.

The foam 400' and the transparent skin 500' are pre-attached or pre-bonded to each other and thus are formed into an integrated product.

In addition, the foam 400' includes an inclined foam 401' and a horizontal foam 403'.

That is, a lower surface of the inclined foam 401' has the same shape as an inclined surface 201 of the upper substrate 200. The horizontal foam 403' has a shape which is disposed above a through-hole 210. The foam 400' has an overall cross section with a trapezoidal shape of which a variable thickness is gradually decreased toward the through-hole 210.

Therefore, a thickness H2' of the horizontal foam 403' may be much less than a maximum thickness H1' of the inclined foam 401'.

In particular, the horizontal foam 403' is additionally pressed using a hot core mold to further form a foam recessed groove 230 in a lower surface thereof.

A thickness H2' of the horizontal form 403' may be considerably reduced (for example, compressed to about 0.4 to 0.6 mm) by a depth of the foam recessed groove 230 so that scattering of light may be minimized without a configuration of a separate hole through which light is emitted.

Accordingly, since light emitted from the light guide plate 300 is illuminated on the very thin horizontal form 403' of the foam 400', scattering of light may be minimized and a viewing angle may be increased. Accordingly, even when symbols 315 are viewed at other angles, it is very advantageous to secure the visibility thereof.

As illustrated in FIG. 7D, the integrated product of the transparent skin 500' and the foam 400' is vacuum-pressed on upper surfaces of the upper substrate 200 and the light guide plate 300 in an IMG mold.

Press-attaching is performed in a such a manner that, when a 3.5 mm fabric, in which the foam 400' having a maximum thickness of 3.0 mm and the transparent skin 500' having a thickness of 0.5 mm are laminated during IMG laminating, is heated to a surface temperature of 160° C. to 190° C. and is vertically vacuum-suctioned and pressed by using a press having a capacity of about 30 tons, a fabric thickness of 2.00 mm is maintained when an IMG mold thickness of 2.0 mm is applied.

The transparent skin 500' integrally attached on an upper surface of the foam 400' may be a thermoplastic olefin (TPO) fabric which has a thickness of 0.4 to 0.8 mm or a thickness of 0.8 mm or more and a transmittance of about 10% to 15%.

Figure 7:
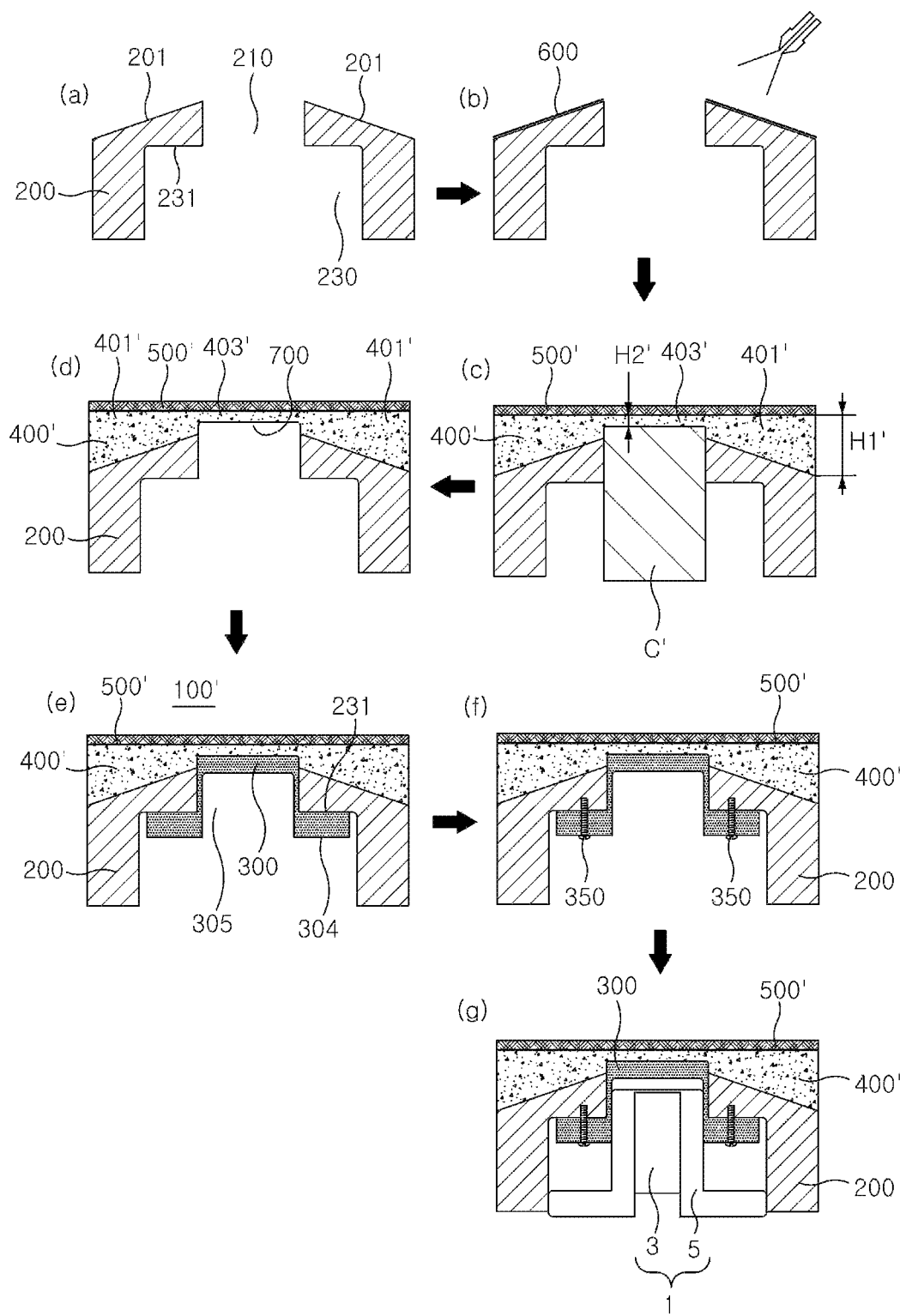
FIG. 7 is a set of sequence diagrams illustrating a method of manufacturing a soft upper trim for switch assembly for a vehicle door according to a second exemplary embodiment of the present invention.

A method of manufacturing the above-described soft upper trim 100' for switch assembly of a vehicle door will be described with reference to FIG. 7.

As illustrated in FIG. 7A, an upper substrate 200 has an inclined surface 201, i.e., an upper surface which is injection-molded, wherein a vertical through-hole 210, into which a switch module 1 is inserted, is formed through a lower side of the vertical through-hole 210.

After the upper substrate 200 is injection-molded, as illustrated in FIG. 7B, an adhesive 600 is applied on the inclined surface 201.

After the adhesive 600 is applied, as illustrated in FIG. 7C, in a state in which a hot core mold C' is vertically inserted into the through-hole 210 of the upper substrate 200, a transparent skin 500' and a foam 400', which are vertically and integrally laminated, are placed on the upper surface 201 of the upper substrate 200 and are vacuum-pressed in an IMG mold.

The hot core mold C' functions to locally compress a horizontal foam 403' so as to have a thickness H2' much less than a thickness H1' of the foam 401'.

After the transparent skin 500' and the foam 400' vertically and integrally laminated are vacuum-pressed on the upper surface 201 of the upper substrate 200, as illustrated in FIG. 7D, when the hot core mold C' is removed, a foam recessed groove 230 is formed in a lower surface of the horizontal foam 403'.

After the foam recessed groove 230 is formed, as illustrated in FIG. 7E, the light guide plate 300 is assembled in the through-hole 210 and the foam recessed groove 230.

The assembly of the light guide plate 300 is completed when the light guide plate 300 is inserted until a flange 304 is caught on a latch stepped portion 231.

In addition, since the light guide plate 300 has a structure which is assembled upwardly, in order to prevent the light guide plate 300 from moving downwardly after being assembled, as illustrated in FIG. 7F, the light guide plate 300 may be fixed on the flange 304 through pieces 350 or the like.

As illustrated in FIG. 7G, the switch module 1 is assembled in an accommodation groove 305 of the light guide plate 300 and the through-hole 210 in the soft upper trim 100 for switch assembly of a vehicle door as manufactured above.

While the exemplary embodiments of the present invention are susceptible to various modifications and alternative forms, specific exemplary embodiments thereof are shown byway of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The invention claimed is:

1. A soft upper trim for switch assembly of a vehicle door, the soft upper trim comprising an upper substrate, a foam, and a transparent skin, which are laminated, wherein:
   the upper substrate has a through-hole vertically formed therein, in which a switch module is inserted;
   an upper surface of the upper substrate is formed as an inclined surface which is gradually inclined upward toward the through-hole;
   the foam includes an inclined foam pressed on the inclined surface and a horizontal foam disposed in the through-hole and having a hole vertically formed therein; and
   a light guide plate is inserted into the through-hole such that a symbol is disposed at a position corresponding to the hole.

2. The soft upper trim according to claim 1, wherein the light guide plate includes side plates, an upper plate which connects upper surfaces of the side plates and has the symbol engraved therein, and flanges which are formed at lower sides of the side plates and are caught on a latch stepped portion of the first through-hole, wherein an accommodation groove, in which a upper side of the switch module is inserted and accommodated, is formed inside a lower side of the light guide plate.

3. A soft upper trim for switch assembly of a vehicle door, the soft upper trim comprising an upper substrate, a foam, and a transparent skin, which are laminated, wherein:

the upper substrate has a first through-hole vertically formed therein, in which a switch module is disposed;

an upper surface of the upper substrate is formed as an inclined surface which is gradually inclined upward toward the through-hole;

the foam includes an inclined foam pressed on the inclined surface and a horizontal foam disposed in the through-hole;

a foam recessed groove at least further recessed upward compared to the foam on the inclined surface of the upper substrate formed in a lower surface of the horizontal foam; and a light guide plate having an upper surface engraved with a symbol inserted into the through-hole and the foam recessed groove.

4. The soft upper trim according to claim 3, wherein the light guide plate includes side plates, an upper plate which connects upper surfaces of the side plates and has the symbol engraved therein, and flanges which are formed at lower sides of the side plates and are caught on a latch stepped portion of the first through-hole, wherein an accommodation groove, in which a upper side of the switch module is inserted and accommodated, is formed inside a lower side of the light guide plate.

* * * * *